Dec. 14, 1965　　　　　H. E. CORBITT　　　　3,223,859
A.C. MAGNETOHYDRODYNAMIC GENERATOR
Filed June 25, 1962

INVENTOR.
HOWARD E. CORBITT
BY
ATTORNEY

United States Patent Office 3,223,859
Patented Dec. 14, 1965

3,223,859
A.C. MAGNETOHYDRODYNAMIC GENERATOR
Howard E. Corbitt, Arcadia, Calif., assignor to Aerojet-General Corporation, Azusa, Calif., a corporation of Ohio
Filed June 25, 1962, Ser. No. 204,749
10 Claims. (Cl. 310—11)

This invention relates to a magnetohydrodynamic generator and more particularly to direct production of alternating current (A.-C.) power from a hydrodynamic generator.

Magnetohydrodynamic generation of electricity offers an attractive alternative to conventional electric power plants both because of a larger overall potential thermal efficiency, and because of possible economies in cost of construction, along with a decrease in the size of the power plant. The decrease in weight and size offered by magnetohydrodynamic power generation has suggested a useful potential for the generation of electric power in space applications.

It is well-known that when a gas is heated sufficiently, it is ionized and free electrons are liberated. This phenomenon is the basis of the operation of magnetohydrodynamic generation. Heretofore, magnetohydrodynamic generators such as those shown and described in the magazine "Westinghouse Engineer," July 1960 issue, have been divisible into two categories; these are the straight-through magnetohydrodynamic generators and the vortex magnetohydrodynamic generators. Hereafter, these magnetohydrodynamic generators are referred to as MHD generators. Of these, the vortex-type generator offers the greatest potential advantage due to its compact size. This leads to a reduction of heat transfer and boundary layer losses. In addition, the vortex MHD generator is accompanied by a relatively high output voltage along with more efficient utilization of the magnetic field and an inherent reliability of design.

MHD generators heretofore constructed have produced direct current power. However, A.-C. power is more useful from the standpoint of power transmission and flexibilty of application. Although the D.-C. power could be converted to A.-C. power by means of inverters or motor generator combinations, this would involve serious power losses. It is apparent that it would be more desirable to design the MHD generator to produce A.-C. power directly.

What is needed, therefore, and comprises an important object of this invention is to provide a simple, convenient, and economical MHD generator for the direct generation of A.-C. power without introducing power losses, or introducing phase and inductance difficulties.

A further object of this invention is to provide an MHD generator with combined means for forcing hot gases through the gas flow chamber and for causing the magnetic field in the gas flow chamber to alternate in polarity.

The invention, in its broadest aspect, comprises covering opposite sides of a gas flow chamber in a MHD generator with pieces of magnetic material. These pieces of magnetic material extend beyond the sides of the gas flow chamber until the adjacent surfaces of the pieces of magnetic material face each other, defining thereby a sort of chamber.

A magnet is rotatably mounted inside this chamber and the rotation of this magnet alternates the flux direction in the magnetic material so that the magnetic field in the gas flow chamber alternates in accordance with the rotation of the magnet. The reluctance between the pieces of magnetic material adjacent the magnet is high in comparison to the reluctance between the pieces of magnetic material covering the sides of the gas flow chamber. Consequently, the magnetic field induced in the magnetic material is concentrated in the gas flow chamber. Electrodes are positioned in the gas flow chamber and the alternation of the magnetic field in the gas flow chamber causes an alternating potential to be developed on these electrodes. This leads to direct production of alternating electric power by the MHD generator.

Some of the objects of the invention having been stated, other objects of this invention will become more apparent when read in the light of the accompanying drawings and specification wherein.

Figure 1:
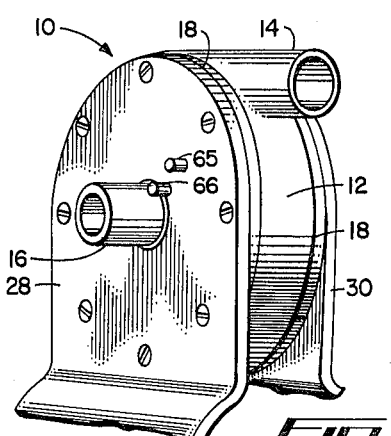
FIGURE 1 is a fragmentary perspective view of a vortex MHD generator constructed in accordance with the present invention.

Referring now to FIGURE 1 of the drawings, a vortex MHD generator, indicated generally by the reference numeral 10 comprises a generally cylindrical housing 12. The housing includes a generally tangential gas input conduit 14 and an axially extending gas outlet conduit 16. As shown in FIGURE 1, the gas outlet conduit 16 is rigidly secured to a cover plate 18 which provides access to the interior of the housing.

Figure 2:
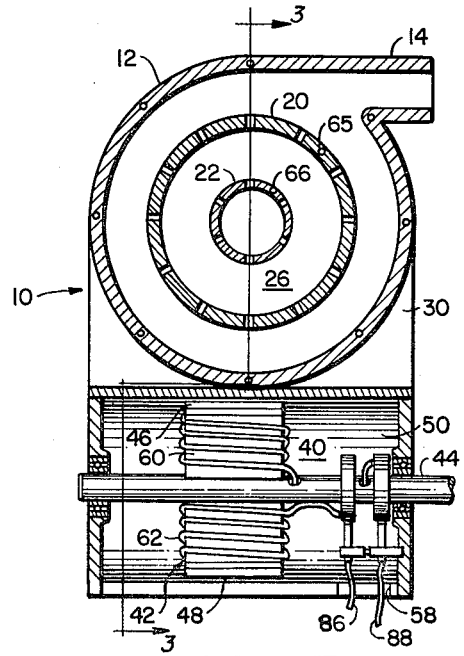
FIGURE 2 is a front elevation view, partially in longitudinal section, of the generator shown in FIGURE 1, but with the cover plate of the generator housing removed and showing an electromagnet mounted on a rotatable shaft as a component of the generator.

A pair of generally ring-shaped electrodes 20 and 22 are mounted in the housing concentric with each other and coaxial with the housing itself (see FIGURE 2). The electrodes 20 and 22 may be slotted or porous so that gas forced through the tangential inlet conduit 14 spirals through the electrodes 20 and 22 and out the axially extending outlet conduit 16, in a manner well-known in the art.

Figure 3:
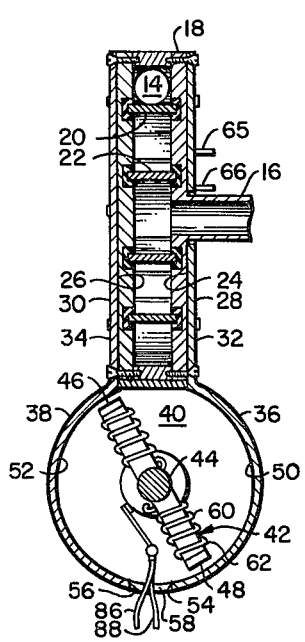
FIGURE 3 is a transverse sectional view taken substantially along the line 3—3 in FIGURE 2, but with the cover plate of the generator housing in place.

The oppositely disposed planar surfaces 24 and 26 of the housing are covered with pieces of magnetic material, indicated generally by the reference numerals 28 and 30 (FIGURE 3). Pieces 28 and 30 include flat portions 32 and 34 and integrally attached portions 36 and 38 which, in this particular embodiment, are semicircular in cross-section. The concave surfaces of portions 36 and 38 face each other and define thereby a generally tubular region 40.

A magnet indicated generally by the reference numeral 42 is rotatably mounted on a driven shaft 44 in space 40, and the axis of rotation of the magnet 42 is concentric with the tubular region defined by the semi-circular portions 36 and 38. In addition, the length of the magnet 42 is such that its extreme portions 46 and 48 are closely adjacent the inner surfaces 50 and 52 of the semicircular portions 36 and 38 to decrease the reluctance between end portions 46 and 48 of magnet 42 and portions 36 and 38 of the magnetic pieces 28 and 30. This increases the magnetization of these pieces. The ends of the magnetic pieces 28 and 30 (54 and 56) are in spaced relationship to each other, defining an air gap 58. The size of the air gap 58 is such that the reluctance of air gap 58 is greater than the reluctance between the flat portions 32 and 34 of the magnetic pieces 28 and 30. With this arrangement, any magnetic field induced in magnetic pieces 28 and 30 will be concentrated in the housing 12.

As shown in the drawings, the magnet 42 comprises an armature 60 with a coil 62 wound thereon. The coil 62 is adapted to be connected to a D.-C. source, as from D.-C. generator 64 (shown in FIGURE 4). It is to be understood, however, that magnet 42 could also be permanent. However, the advantage of using an electromagnet is that the flux density in the magnetic pieces 28 and 30 and hence the intensity of the magnetic field developed in housing 12 can be optimized for the most efficient power output. With a D.-C. source connected to coil 62, the electromagnet will be polarized with, for example, end portion 46 comprising the north pole of the magnet, and end portion 48 comprising the south pole of the magnet.

As will be described below, the magnet is caused to rotate with the driven shaft 44. This rotation causes the magnetic flux generated in magnetic pieces 28 and 30 to alternate in direction and consequently causes the magnetic field in housing 12 to alternate in synchronization with the rotation of the magnet. This alternation in the magnetic field causes the output leads 65 and 66 connected to electrodes 20 and 22 to develop an alternating potential.

Figure 4:
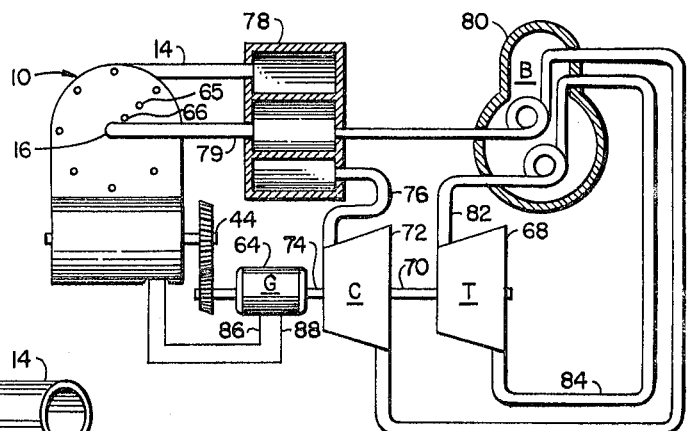
FIGURE 4 is a diagrammatic view showing the vortex MHD generator of FIGURES 1–3, inclusive, installed in a power plant system.

As seen in FIGURE 4, the vortex MHD generator is shown incorporated in a power plant. The power plant includes a turbine 68 which may be steam driven or powered by any other source, such as nuclear energy. This turbine drives the input shaft 70 of a compressor 72. The output shaft 74 of the compressor drives driven shaft 44 which is secured to magnet 42 (see FIGURE 2). In addition, the operation of the compressor forces hot gases through conduit 76 and heat exchanger 78 to the input conduit 14 of housing 12. The outlet conduit 16 of housing 12 is connected to conduit 79 which leads to heat exchanger 78 and boiler 80 and from there back to the input of compressor 72 to complete the hot gas cycle.

As shown in FIGURE 4, the turbine inlet and outlet conduits 82 and 84 are connected to boiler 80 in a manner well-known in the art. In addition, the turbine 68 drives a small D.-C. generator 64 whose output leads 86 and 88 are adapted to be connected to the coil 62 of the electromagnet 42 shown in FIGURE 3.

With this arrangement, turbine 68 drives compressor 72 and causes magnet 42 to rotate. Consequently, turbine 68 has a combined function in that by driving the compressor, it forces the hot gases through the housing 12, while the rotation of magnet 42 produces an alternating magnetic field inside the housing.

The hot gases entering the housing 12 through inlet conduit 14 possess a number of free electrons. These electrons are deflected by the magnetic field induced in the housing by the rotation of magnet 42 and since the magnetic field inside housing 12 is alternating, the movement of the electrons against electrodes 20 and 22 will also alternate. With this arrangement, when the electrodes 20 and 22 are connected to a load, an alternating voltage appears thereon.

It is apparent that by altering the shape of portions 36 and 38 of the magnetic pieces, the MHD generator can produce an alternating or pulsating voltage output which has virtually any shape including that of a sinusoidal wave.

It is contemplated that turbine 68 and compressor 72 could be connected to a plurality of MHD generators, and by appropriately positioning the magnets 42 relative to each other on the driven shaft 44, the various MHD generators could be electrically connected together to obtain either increased single-phase power or to obtain multi-phase power. The latter would be useful for power transmission lines.

Although the inventon described above has been shown applied to a vortex MHD generator, it is apparent that the principles of this invention can be applied to other kinds of MHD generators, such as the longitudinal or straight-through type, or to other geometric configurations.

It is to be understood that the form of the invention herewith shown and described is to be taken as a preferred example of the same, and that various changes in the shape, size, and arrangement of the parts may be resorted to without departing from the spirit of this invention or the scope of the claims.

I claim:
1. A magnetohydrodynamic generator comprising a gas flow chamber for permitting a high temperature stream of gases to flow therethrough, magnetic material mounted outside the gas flow chamber on opposite sides thereof, first and second electrodes mounted in said chamber and positioned to receive electrons moving with a gas stream and adapted to be deflected by a magnetic field, said magnetic material having a low reluctance portion and a high reluctance portion, said gas flow chamber being positioned in the low reluctance portion, a magnet positioned in proximity to the high reluctance portion of the magnetic material, and combined means for causing the magnet to rotate and for forcing a high temperature gas stream through the gas flow chamber, whereby the rotation of said magnet in proximity to said high reluctance portion of the magnetic material induces an alternating magnetic field which is concentrated in said gas flow chamber so that an alternating voltage appears across said first and second electrodes.

2. The magnetohydrodynamic generator described in claim 1 wherein said magnet comprises an armature, an electric coil wrapped over said armature, said coil being connected to a source of direct current to magnetize the armature, and the magnitude of the direct current being selected so the strength of the alternating magnetic field induced by the rotation of said magnet is optimized for the most efficient power generation.

3. A magnetohydrodynamic generator comprising a gas flow chamber for permitting a high temperature stream of gases to flow therethrough, first and second pieces of magnetic material mounted outside the gas flow chamber on opposite sides thereof, first and second electrodes mounted in said chamber and positioned to receive electrons moving with a gas stream and adapted to be deflected by a magnetic field, each piece of magnetic material comprising a generally flat portion and a portion have a predetermined shape, the flat portions of said pieces of magnetic material lying against opposite sides of said gas flow chamber with said portions having a predetermined shape extending beyond the opposite sides of said gas flow chamber in spaced relation to each other, a magnet mounted between said portions of the magnetic pieces having said predetermined shape, combined means for causing the magnet to rotate and for forcing a high temperature gas stream through the gas flow chamber, and said portions of the magnetic pieces having said predetermined shape defining a region having a reluctance high in comparison to the reluctance in the region between the flat portions of the pieces of magnetic material so that the rotation of said magnet induces an alternating magnetic field which is concentrated in said chamber, whereby an alternating voltage appears across said first and second electrodes, the wave shape of the alternating voltage being governed by the shape of the portions of the magnetic pieces having said predetermined shape.

4. A magnetohydrodynamic generator comprising a gas flow chamber for permitting a high temperature stream of gases to flow therethrough, first and second pieces of magnetic material mounted outside the gas flow chamber on opposite sides thereof, first and second electrodes mounted in said chamber and positioned to receive electrons moving with a gas stream and adapted to be deflected by a magnetic field, each piece of magnetic material comprising a portion semi-circular in cross-section and a generally flat portion, the flat portions of said pieces of magnetic material lying against opposite sides of said gas flow chamber with semi-circular portions facing each other in spaced relationship and defining a generally tubular portion, an elongated magnet mounted inside said tubular portion and rotatable around an axis concentric with said tubular portion with opposite ends of said magnet moving in close proximity to the concave surfaces of the semi-circular portions of said magnetic pieces, combined means for causing the magnet to rotate and for forcing a high temperature gas stream through the gas flow chamber, and the ends of said semi-circular portions of said magnetic pieces remote from said flat portions being in spaced relation to each other to provide an air gap having a reluctance high in comparison to the reluctance in the region between the flat portions of the pieces of magnetic material so that the rotation of said magnet induces a sinusoidal alternating magnetic field which is concentrated in said chamber, whereby a sinusoidal alternating voltage appears across said first and second electrodes.

5. The magnetohydrodynamic generator described in claim 4 wherein said magnet comprises an armature, an electric coil wrapped over said armature, said coil being connected to a source of direct current to magnetize the armature, and the magnitude of the direct current being selected so the strength of the alternating magnetic field produced by the rotation of said magnet can be optimized for the most efficient power generation.

6. The magnetohydrodynamic generator described in claim 5 wherein said combined means includes a driven shaft, said armature being mounted on said driven shaft and rotatable therewith, a compressor, said compressor having an output shaft and an input shaft, the output shaft of said compressor driving said driven shaft, and a turbine, said turbine driving the input shaft of said compressor, whereby operation of said turbine causes said compressor to be operated so that the high temperature gas stream is forced through said gas flow chamber and said armature is rotated within said driven shaft.

7. The magnetohydrodynamic generator described in claim 6 wherein said source of direct current comprises a D.-C. generator, and said turbine driving said D.-C. generator.

8. A vortex magnetohydrodynamic generator comprising a generally cylindrical housing, said housing having a generally tangential gas input portion and an axially extending gas outlet portion and defining a gas flow chamber for receiving a high temperature stream of gases adapted to flow therethrough, first and second pieces of magnetic material mounted outside the gas flow chamber on opposite sides of said housing, electrodes mounted in said housing, said electrodes being positioned concentric with each other and coaxial with said housing to receive electrons moving with a gas stream and adapted to be deflected by a magnetic field, each piece of magnetic material comprising a portion semi-circular in cross-section and a generally flat portion, the flat portions of said pieces of magnetic material lying against the opposite generally flat sides of said housing with said semi-circular portions facing each other in spaced relationship and defining a generally tubular portion, an elongated magnet mounted inside said tubular portion and rotatable around an axis concentric with said tubular portion with opposite ends of said magnet moving in close proximity to the concave facing surfaces of said semi-circular portions, combined means for causing the magnet to rotate and for forcing a high temperature gas stream through the gas input portion of the housing and out the axially extending gas outlet portion, the ends of said semi-circular portions of said magnetic pieces remote from said flat portions being in spaced relation to each other to provide an air gap having a reluctance high in comparison to the reluctance in the region between the flat portions of the pieces of magnetic material so that the rotation of said magnet induces a sinusoidal alternating magnetic field which is concentrated in said housing, whereby a sinusoidal alternating voltage appears across said electrodes.

9. The vortex magnetohydrodynamic generator described in claim 8 wherein said magnet comprises an armature, an electric coil wrapped over said armature, and said coil being connected to a source of direct current to magnetize the armature.

10. The vortex magnetohydrodynamic generator described in claim 9 wherein said combined means includes a driven shaft, said armature being mounted on said driven shaft and rotatable therewith, a compressor, said compressor having an output shaft and an input shaft, the output shaft of said compressor driving said driven shaft, a turbine, said turbine driving the input shaft of said compressor, whereby operation of said turbine causes the compressor to be operated so that the high temperature gas stream is forced through said gas flow chamber defined by said housing and said armature is rotated with said driven shaft, said source of direct current comprising a D.-C. generator, and said turbine driving said D.-C. generator.

No references cited.

ORIS L. RADER, *Primary Examiner.*

DAVID X. SLINEY, *Examiner.*